United States Patent
Drexler et al.

(10) Patent No.: US 12,209,409 B2
(45) Date of Patent: Jan. 28, 2025

(54) SOUND ABSORBING PANELS

(71) Applicant: The Boeing Company, Chicago, IL (US)

(72) Inventors: Jason W. Drexler, Brier, WA (US); John C. Wilde, Mill Creek, WA (US); Joshua M. Montgomery, Seattle, WA (US); Phuong Minh Nguyen, Edmonds, WA (US); Joseph U. Kauffman, Bothell, WA (US)

(73) Assignee: THE BOEING COMPANY, Arlington, VA (US)

( * ) Notice: Subject to any disclaimer, the term of this patent is extended or adjusted under 35 U.S.C. 154(b) by 380 days.

(21) Appl. No.: 16/880,828

(22) Filed: May 21, 2020

(65) Prior Publication Data

US 2021/0363748 A1 Nov. 25, 2021

(51) Int. Cl.
  *E04B 1/84* (2006.01)
  *B32B 3/12* (2006.01)
  (Continued)

(52) U.S. Cl.
  CPC .............. *E04B 1/8409* (2013.01); *B32B 3/12* (2013.01); *B32B 5/26* (2013.01); *B32B 5/28* (2013.01);
  (Continued)

(58) Field of Classification Search
  CPC ......... B60R 13/0815; B32B 3/12; B32B 5/26; B32B 2260/021; B32B 2307/102;
  (Continued)

(56) References Cited

U.S. PATENT DOCUMENTS 1,379,191 A   4/1983  Beggs et al.
4,379,191 A * 4/1983  Beggs .................. G10K 11/172
                                                      428/118

(Continued)

FOREIGN PATENT DOCUMENTS

CN         201619265 U  * 11/2010
CN         209580710 U    11/2019
WO     WO-2005044630 A1 *  5/2005  ......... B60R 13/0815

OTHER PUBLICATIONS

Machine Translation of DE 4126781 A1. Lightweight Surface Element and Method for Producing Such A. Meinei. Feb. 1993 (Year: 1993).*

(Continued)

*Primary Examiner* — Forrest M Phillips
*Assistant Examiner* — Jennifer B. Olson
(74) *Attorney, Agent, or Firm* — MH2 Technology Law Group LLP

(57) ABSTRACT

The present teachings generally relate to an acoustic panel including a backing layer, honeycomb core attached to the backing layer, a mesh layer attached to the honeycomb core, and a face sheet including a flexible acoustic fabric face sheet attached to the mesh layer. The acoustic fabric face sheet can provide improved sound dampening characteristics over, for example, a perforated face sheet, and at a lower manufacturing cost, weight, and a simplified manufacturing process. The acoustic fabric face sheet can be or include a flexible woven and/or knitted fabric including a polymer such as an aromatic polyamide that includes a meta-aramid fiber, or a fiberglass fabric.

20 Claims, 5 Drawing Sheets

(51) Int. Cl.
  *B32B 5/26* (2006.01)
  *B32B 5/28* (2006.01)
  *B32B 7/12* (2006.01)
  *B60R 13/08* (2006.01)
  *E04B 1/74* (2006.01)

(52) U.S. Cl.
  CPC ............ *B32B 7/12* (2013.01); *B60R 13/0815* (2013.01); *B32B 2260/021* (2013.01); *B32B 2260/046* (2013.01); *B32B 2307/102* (2013.01); *B32B 2605/003* (2013.01); *E04B 2001/748* (2013.01); *E04B 2001/8461* (2013.01)

(58) Field of Classification Search
  CPC ....... B32B 2605/003; B32B 5/28; B32B 7/12; B32B 7/14; B32B 37/1292; B32B 2260/046; B32B 37/146; E04B 2001/748; E04B 2001/8461; Y10T 428/24149; Y10T 428/24165; B29D 24/005
  USPC .................................. 181/222, 284, 292, 288
  See application file for complete search history.

(56) References Cited

U.S. PATENT DOCUMENTS

| | | | | |
|---|---|---|---|---|
| 4,465,725 | A * | 8/1984 | Riel | B32B 27/12 |
| | | | | 428/116 |
| 6,065,717 | A | 5/2000 | Brock | |
| 6,267,838 | B1 | 7/2001 | Saugnac et al. | |
| 6,371,242 | B1 * | 4/2002 | Wilson | B32B 7/12 |
| | | | | 428/116 |
| 7,581,366 | B2 * | 9/2009 | Smith | E04C 2/365 |
| | | | | 428/116 |
| 7,988,809 | B2 * | 8/2011 | Smith | E04C 2/365 |
| | | | | 428/118 |
| 8,696,843 | B1 | 4/2014 | Dean | |
| 8,820,477 | B1 * | 9/2014 | Herrera | F02C 7/045 |
| | | | | 181/292 |
| 9,085,894 | B2 * | 7/2015 | Eckman | B32B 13/02 |
| 11,434,819 | B2 * | 9/2022 | Murugappan | F04D 29/545 |
| 2007/0054087 | A1 | 3/2007 | Smith et al. | |
| 2010/0247848 | A1 | 9/2010 | Hotzeldt et al. | |
| 2014/0235122 | A1 | 8/2014 | Fracchia et al. | |
| 2014/0329043 | A1 | 11/2014 | Shigetomi | |
| 2015/0284947 | A1 | 10/2015 | Take et al. | |
| 2017/0106620 | A1 | 4/2017 | Smith et al. | |
| 2018/0257196 | A1 | 9/2018 | Simpson et al. | |
| 2019/0003177 | A1 | 1/2019 | Butler et al. | |

OTHER PUBLICATIONS

Machine Translation of CN 201619265 U. Inventor: Jiang. Title: "Light Composite Material". Published Nov. 3, 2011 (Year: 2010).*
Nissan Ariya Concept with acoustic meta-material for outstanding noise insulation, screen captures of video https://youtu.be/yE0Djsp6Fug, Jan. 6, 2020, 3 pages.
Road/Show by CNET, https://www.cnet.com/roadshow/news/nissan-acoustic-metal-material-ev-leaf-ces-2020 Dated Jan. 7, 2020, 2 pages.
Drexler et al., "Sound Absorbing Structures," U.S. Appl. No. 17/445,148, filed Aug. 16, 2021.
Meyer, Matthias (EP Examiner), partial European Search Report (R. 64 EPC) issued Jan. 3, 2023 in related European Application No. 22190343.8, 16 pages.
Unknown, "Aeria—MaterialDistrict," retrieved from the internet @ https://materialdistrict.com/material/aeria [retrieved on Dec. 16, 2022] Jun. 16, 2010.
Meyer, Matthias (EP Examiner), extended European Search Report (R. 61 EPC and R. 63 EPC) issued Mar. 30, 2023 in related European Application No. 22190343.8, 18 pages.
Unknown, "Texaa Acoustic Panel Stereo Original," Mar. 1, 2018, pp. 1-23, retrieved from the internet: https://www.esprit-pha.cz/wp-content/uploads/2018/06/version-Web_Catal_Stereo_en.pdf.
Extended European Search Report issued in related European Patent Application No. 24205411.2, dated Nov. 15, 2024, 12 pages.

* cited by examiner

SOUND ABSORBING PANELS

TECHNICAL FIELD

The present teachings relate to the field of sound absorbing panels for suppressing ambient noise (e.g., reflected noise), such as within a structure, for example, a transportation vehicle, or for other uses where mitigation of ambient noise is desired.

BACKGROUND

During operation of a vehicle, noise can be generated from multiple sources. For example, in an aircraft, noise is generated particularly from exterior turbulent flow, aircraft engine jet exhaust, and vibrations resulting therefrom. Solid surfaces within the interior of the vehicle reflect sound waves, often resulting in the need for personnel within the vehicle to wear ear protection and communicate via headsets and microphones. For crew and passenger comfort and safety within commercial vehicle, noise-attenuation techniques are typically incorporated to reduce the transfer of sound through the flight deck and passenger compartment. One common technique employs the use of sound absorbing panels attached to vertical surfaces of an interior of the vehicle to reduce reflected sound waves.

Some conventional sound absorbing panels (i.e., acoustic panels) include a back skin, an open-cell honeycomb core having a first side attached to the back skin, an open weave reinforcement attached to a second side of the honeycomb core, and a rigid perforated face sheet attached to the leno weave reinforcement. Some acoustic panel designs further include a mesh layer positioned between the honeycomb core and the perforated face sheet, where the mesh layer is acoustically transparent. The acoustic panels are attached to interior surfaces of the aircraft flight deck and passenger compartment and provide an effective structure for reducing noise within the vehicle. The perforated face sheet provides a durable surface that is resistant to damage from physical contact and is highly flame resistant.

An acoustic panel design having improved sound attenuation and/or other advantages over conventional acoustic panels would be a welcome addition to the art.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation of the present teachings, an acoustic panel includes a backing layer, a honeycomb core attached to the backing layer, the honeycomb core including a first side, a second side, a thickness that extends from the first side to the second side, and a plurality of walls that define a plurality of honeycomb cells, wherein the plurality of honeycomb cells extend through the thickness of the honeycomb core from the first side to the second side. The acoustic panel further includes a mesh layer attached to the honeycomb core and an acoustic fabric face sheet attached to the mesh layer wherein the acoustic panel is configured so that the acoustic fabric face sheet is visually exposed during use of the acoustic panel.

Optionally, the acoustic fabric face sheet can include a woven fabric, a knitted fabric, or both, and may include one or more of a polyester, an aramid polymer, an aromatic polyamide, meta-aramid fibers, a modacrylic fabric, a fabric including a high-density carbon shell that encases a viscoelastic core, and/or para-aramid fibers.

Optionally, the mesh layer can include one or more of a fiberglass fabric, a polyester fabric, an 8800 leno weave knitted fabric, a nylon, a rayon, an acrylic, cotton, wool, and combinations of two or more thereof. In an implementation, either the backing layer or the mesh layer, or both, can be impregnated with an adhesive. Optionally, the backing layer is moisture resistant and includes one or more of fiberglass, carbon fiber, a poly-paraphenylene terephthalamide fabric, a meta-aramid fabric, metal, paper, wood, or plastic. The acoustic panel can have an absorption coefficient of from 0.6 to 1.0 as measured by ASTM E1050-98 over a frequency range of from 400 Hz to 5,000 Hz. In an implementation, the thickness of the honeycomb core can be from 0.25 inches to 2.0 inches.

In another implementation, a noise reducing system includes an acoustic panel attached to a surface that defines a passenger compartment of a transportation vehicle. In this implementation, the acoustic panel includes a backing layer and a a honeycomb core attached to the backing layer. The honeycomb core includes a first side, a second side, a thickness that extends from the first side to the second side, and a plurality of walls that define a plurality of honeycomb cells, wherein the plurality of honeycomb cells extend through the thickness of the honeycomb core from the first side to the second side. The acoustic panel further includes a mesh layer attached to the honeycomb core and an acoustic fabric face sheet attached to the mesh layer, wherein the acoustic panel is configured so that the acoustic fabric face sheet is visible to passengers during use of the transportation vehicle.

Optionally, the acoustic fabric face sheet can include a woven fabric, a knitted fabric, or both, and may include one or more of a polyester, an aramid polymer, an aromatic polyamide, meta-aramid fibers, a modacrylic fabric, a fabric including a high-density carbon shell that encases a viscoelastic core, and/or para-aramid fibers.

Optionally, the mesh layer can include one or more of a fiberglass fabric, a polyester fabric, an 8800 leno weave knitted fabric, a nylon, a rayon, an acrylic, cotton, wool, and combinations of two or more thereof. In an implementation, either the backing layer or the mesh layer, or both, can be impregnated with an adhesive. Optionally, the backing layer is moisture resistant and includes one or more of fiberglass, carbon fiber, a poly-paraphenylene terephthalamide fabric, a meta-aramid fabric, metal, paper, wood, or plastic. The acoustic panel can have an absorption coefficient of from 0.6 to 1.0 as measured by ASTM E1050-98 over a frequency range of from 400 Hz to 5,000 Hz. In an implementation, the thickness of the honeycomb core can be from 0.25 inches to 2.0 inches.

In another implementation, a method for forming an acoustic panel includes attaching a backing layer to a first side of a honeycomb core, wherein the honeycomb core further includes a second side opposite to the first side, a thickness that extends from the first side to the second side, and a plurality of walls that define a plurality of honeycomb cells, wherein the plurality of honeycomb cells extend through the thickness of the honeycomb core from the first side to the second side. The method further includes attaching a first side of a mesh layer to the second side of the honeycomb core, and attaching a acoustic fabric face sheet to a second side of the mesh layer, wherein the acoustic panel is configured so that the acoustic fabric face sheet is visually exposed during use of the acoustic panel.

Optionally, the backing layer can be pre-impregnated with a first adhesive and the mesh layer is pre-impregnated with a second adhesive, and the method can further include stacking the backing layer, the honeycomb core, and the mesh layer to form a panel subassembly, and applying a heat and a pressure to the panel subassembly to cure the first adhesive and the second adhesive of the panel subassembly, thereby bonding the backing layer and the mesh layer to the honeycomb core. Further, subsequent to curing the first adhesive and the second adhesive, the method can also include attaching the acoustic fabric face sheet to the mesh layer using a third adhesive, wherein the third adhesive is patterned so that the third adhesive forms a cross sectional non-continuous layer to overlie only the plurality of walls of the honeycomb core and to not overlie the plurality of honeycomb cells. In an implementation, the acoustic fabric face sheet can include one or more of a polyester, an aramid polymer, an aromatic polyamide, meta-aramid fibers, a modacrylic fabric, a fabric including a high-density carbon shell that encases a viscoelastic core, and/or para-aramid fibers. The mesh layer can include one or more of a fiberglass fabric, a polyester fabric, an 8800 leno weave knitted fabric, a nylon, a rayon, an acrylic, cotton, wool, and combinations of two or more thereof.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to example implementations of the present teachings, examples of which are illustrated in the accompanying drawings. Generally and/or where convenient, the same reference numbers will be used throughout the drawings to refer to the same or like parts.

As discussed above, some conventional acoustic panels include a back skin, an open-cell honeycomb core having a first side attached to the back skin, a leno weave reinforcement mesh layer, and a rigid perforated face sheet provided by a perforated laminate attached to a second side of the honeycomb core. While these conventional acoustic panels are effective in reducing reflection of sound waves, they suffer some limitations. For example, the perforations through the face sheet, which allow sound waves to pass through the face sheet and enter the honeycomb core, are difficult and expensive to manufacture. The perforations must be precisely aligned and formed to provide an esthetically pleasing surface, as the face sheet is visible to passengers and crew. Additionally, the acoustic panels are relatively heavy, resulting at least partially from a relatively large mass of the perforated face sheet, which is manufactured from fiber-reinforced plastics and can include an aluminum foil.

The present teachings include an acoustic panel that can, in some implementations, be lighter in weight, more easily manufactured at a lower cost, and/or has improved sound dampening characteristics over some conventional acoustic panels. An acoustic panel according to the present teachings can have a decreased weight compared to conventional acoustic panels, resulting at least partially from use of an acoustic fabric face sheet instead of a fiber-reinforced plastic perforated face sheet. The weight of an acoustic panel according to the present teachings can be reduced by as much as 0.27 kilograms per square meter ($kg/m^2$) compared to conventional acoustic panel designs.

Figure 1:
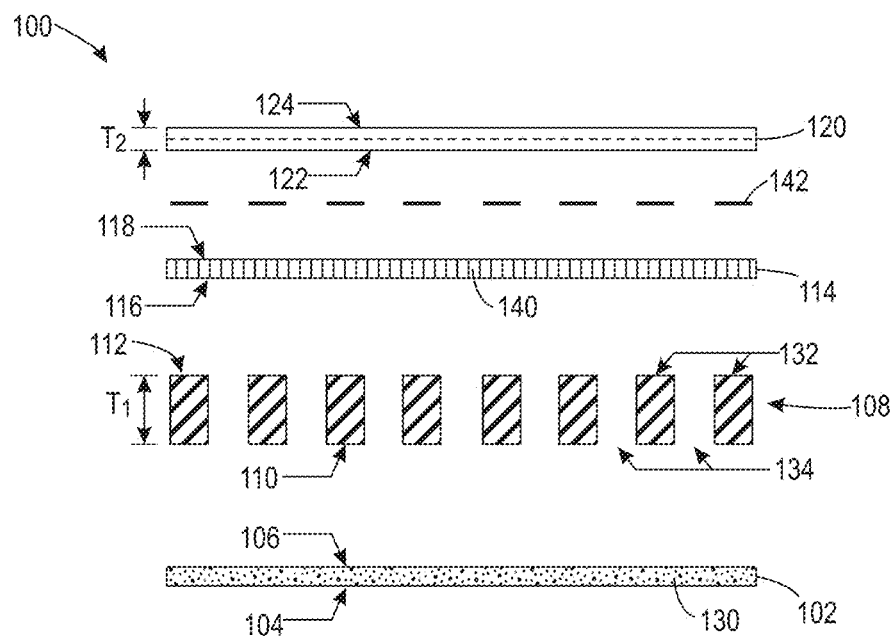
FIG. 1 is an exploded cross section of an acoustic panel according to an implementation of the present teachings.
Figure 2:
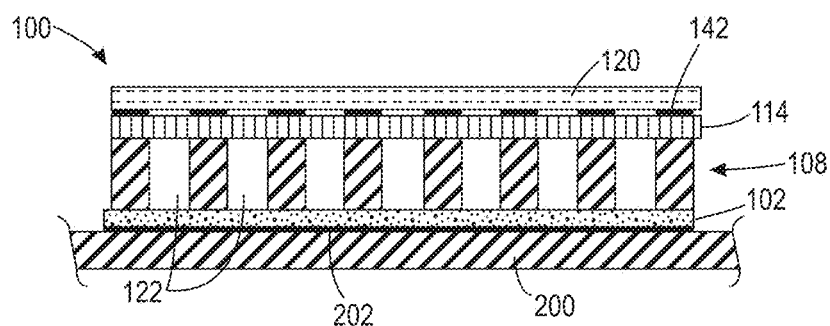
FIG. 2 is a cross section of the structure of FIG. 1 after assembly.

In-process structures which can be formed during an implementation of the present teachings are depicted in FIGS. 1 and 2. FIG. 1 depicts an exploded cross section of an acoustic panel 100 in accordance with an implementation of the present teachings, and FIG. 2 depicts an assembled cross section of the FIG. 1 implementation. This implementation includes a backing layer 102 such as a moisture-resistant backing layer having a first side 104 and a second side 106, and a honeycomb core 108 (e.g., fiberglass, carbon fiber, a poly-paraphenylene terephthalamide fabric such as Kevlar®, a meta-aramid fabric including meta-aramid fibers such as Nomex®, etc.) in a thermoset or thermoplastic matrix (e.g., phenolic, epoxy, polyester, etc.). The honeycomb core 108 can include a first side 110 and a second side 112. This implementation can further include a mesh layer 114 as described in more detail below where the mesh layer 114 includes a first side 116 and a second side 118. The mesh layer 114 improves structural stiffness and/or strength of the acoustic panel while allowing sound to enter the honeycomb core. Implementations of the present teachings further include an acoustic fabric face sheet 120 having a first side 122 and a second side 124. In this implementation for purposes of description, the "first side" is the surface of a structure that is closest to an attachment surface to which the acoustic panel 100 will be attached, while the "second side" is the surface of the structure that is closest to a personnel space, for example, a passenger cabin or crew flight deck, where the second side is opposite to the first side. It will be appreciated that the figures depict generalized example implementations, and an actual acoustic panel in accordance with the present teachings can include other structures that are not depicted for simplicity, while various depicted structures can be removed or modified.

The backing layer 102 can be or include, for example, fiber (e.g., fiberglass, carbon fiber, a poly-paraphenylene terephthalamide fabric such as Kevlar®, a meta-aramid fabric such as Nomex®, etc.). The backing layer 102 further be or include a material that is pre-impregnated with an adhesive 130, commonly referred to as a prepreg. The adhesive 130 (e.g., thermoset polymer matrix material such as epoxy, or a thermoplastic resin) incorporated into the backing layer 102 adheres the second side 106 of the backing layer 102 to the first side 110 of the honeycomb core 108 as described below. The backing layer 102 can thus be or include a thermoset composite or thermoplastic composite (e.g., phenolic, epoxy, polyester, etc.). The backing layer 102 can also be or include any surface such as metal, paper, wood, plastic, etc., that is suitably rigid to allow secure attachment to a structure such as a surface of a transportation vehicle. The backing layer 102 can have a thickness that is sufficient to provide structural integrity for the intended application of the acoustic panel 100, for example, from about 0.001 inches to about 0.030 inches. During use, the acoustic panel 100 can be attached to a surface 200 (FIG. 2) of a transportation vehicle using one or more fasteners 202, for example, mechanical fasteners such as bolts, screws, hangers, etc., or an adhesive layer such as epoxy.

Figure 3:
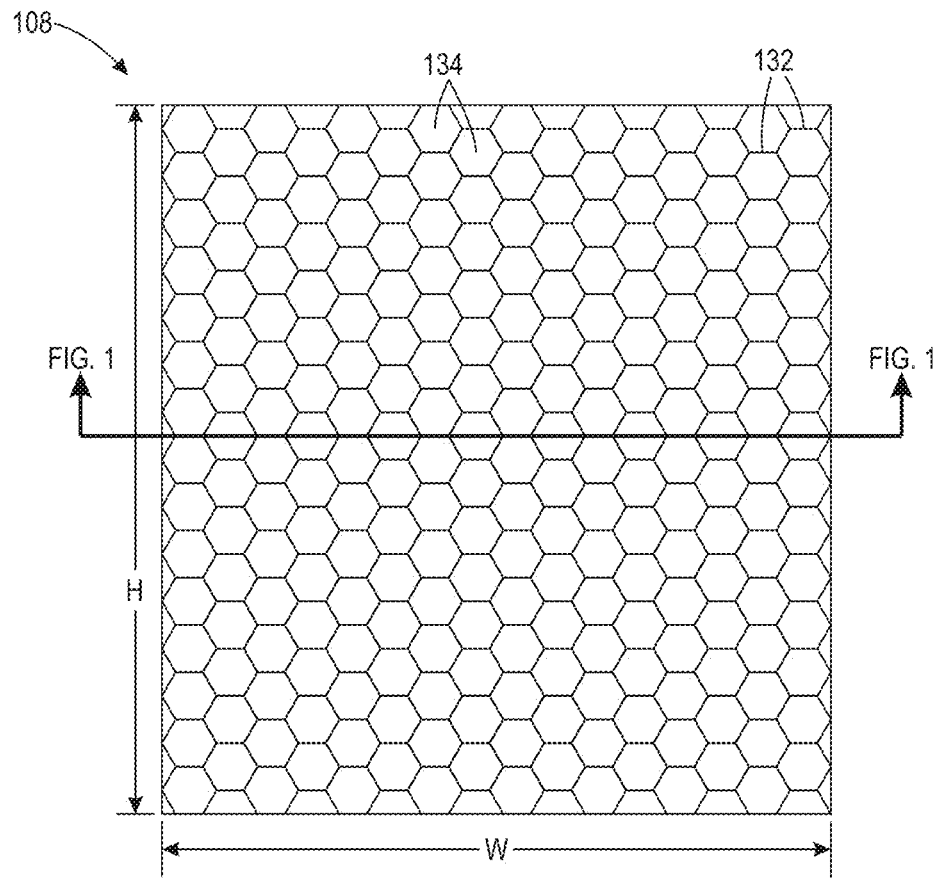
FIG. 3 is a plan view of a honeycomb core according to an implementation of the present teachings.

The honeycomb core 108 can be or include fiber reinforced composite (e.g., fiberglass, carbon fiber, a poly-paraphenylene terephthalamide fabric such as Kevlar®, a meta-aramid fabric including meta-aramid fiber such as Nomex®, etc.) in a thermoset or thermoplastic matrix (e.g., phenolic, epoxy, polyester, etc.). The honeycomb core 108 can also be or include any hard surface such as metal, paper, wood, plastic, etc. The honeycomb core 108 has a thickness "$T_1$" that extends from the first side 110 to the second side 112, wherein the thickness $T_1$ of the honeycomb core 108 can be from about 0.25 inches to about 2 inches, although other thinner or thicker dimensions are contemplated depending on the intended use and design of the acoustic panel. The honeycomb core 108 includes a plurality of walls 132 that define a plurality of honeycomb cells 134, wherein the plurality of honeycomb cells 134 extend through the thickness $T_1$ of the honeycomb core 108 from the first side 110 to the second side 112. The honeycomb core 108 is further depicted in plan view in FIG. 3, where the honeycomb core 108 can have a width "W" of from about 5 inches to about 120 inches and a length or height "H" of from about 5 inches to about 120 inches, although other widths and/or height dimensions are contemplated depending on the intended use and design of the acoustic panel.

The mesh layer 114 can be or include a woven fabric, for example, a fabric woven with an 8800 leno weave, and improves structural stiffness and/or strength of the acoustic panel while allowing sound to enter the honeycomb core. The mesh layer 114 can be or include a fiberglass fabric, carbon fiber fabric and/or a polyester fabric, and can be or include synthetic fibers such as nylon, rayon, acrylic, etc., and natural fibers such as cotton, wool, etc. Suitable mesh layers include Kevlar®, Nomex®, and HexForce™ 8800 available from Hexcel®. The backing layer mesh layer 114 further be a prepreg, where the material of the mesh layer 114 is pre-impregnated with an adhesive 140 (e.g., thermoset polymer matrix material such as epoxy, or a thermoplastic resin). The adhesive 140 incorporated into the mesh layer 114 adheres the first side 116 of the mesh layer 114 to the second side 112 of the honeycomb core 108 as described below. The mesh layer 114 can thus be or include a thermoset composite or thermoplastic composite (e.g., phenolic, epoxy, polyester, etc.).

The acoustic fabric face sheet 120 can be or include a flexible flame resistant material that is durable and resists damage from physical contact with other structures that the acoustic fabric face sheet 120 is likely to come into contact with. Additionally, the acoustic fabric face sheet 120 should be manufactured from a material that is washable or cleanable so that the acoustic fabric face sheet 120, which is visually exposed during use, remains visually attractive. The acoustic fabric face sheet 120 can be or include, for example, Pongs® Silencio® or other flame retardant polyester. Other potentially suitable acoustic fabrics include an aramid polymer such as meta-aramid that includes meta-aramid fibers, flame resistant modacrylic fabric (FRMC®) available from Tyndale USA, a polyester fiber fabric such as Polartec® available from Polartec, LLC, a fabric that forms a high-density carbon shell upon burning that encases a viscoelastic core (for example, a TECGEN® brand fabric), and fabrics that include para-aramid fibers such as a Tencate® brand fabric. Other suitable flame retardant knitted and/or woven fabrics are available from Tisca®, Neotex®, Lantal®, and/or Replin. Some implementations can include both a woven fabric and a knitted fabric. The acoustic fabric face sheet 120 can have a thickness "$T_2$" of from about 0.005 inches to about 0.1 inches, and a basis weight of from about 250 grams per square meter (g/m$^2$) to about 450 g/m$^2$, for example about 350 g/m$^2$, although larger and smaller thicknesses and basis weights are contemplated depending on the intended use and design. Further, the width and length or height of the acoustic fabric face sheet 120 can approximate the width W and length or height H of the honeycomb core 108.

Figure 4:
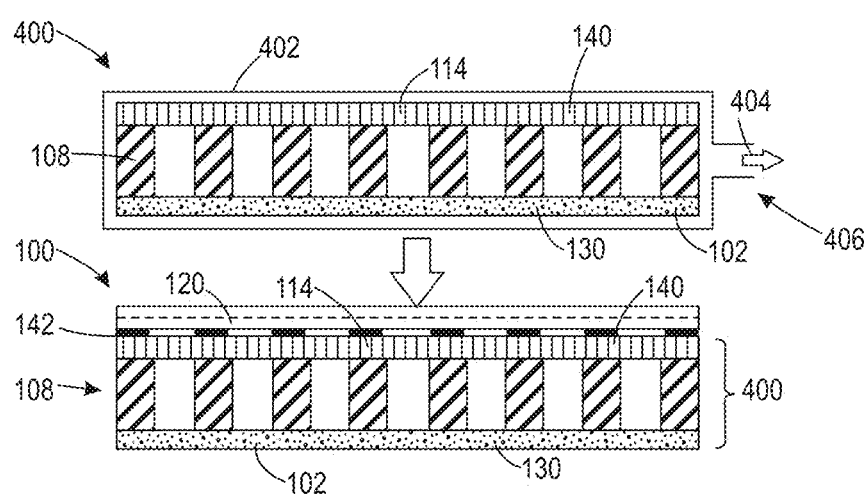
FIG. 4 is a cross section of an implementation for forming an acoustic panel according to the present teachings.

During manufacture of the acoustic panel 100, the backing layer 102, the honeycomb core 108, and the mesh layer 114 can be stacked as depicted in the upper portion of FIG. 4 to form a panel subassembly 400, which is then processed to cure the panel subassembly 400. The processing can include, for example, an application of pressure to the panel subassembly 400 within a fixture 402 such as a vacuum bag 402. Air 404 from within the vacuum bag 402 and around the panel subassembly 400 can be evacuated from of the vacuum bag 402 through a vacuum bag exhaust port 406 using conventional processing techniques. Optionally, heat can be applied to the panel subassembly 400 within the vacuum bag 402 for a suitable duration of time, or the panel subassembly 400 can be cured at ambient (e.g., room) temperature. Application of the heat (optionally) and the pressure cures the panel subassembly 400, for example, by curing the adhesive 130 that impregnates the backing layer 102, thereby bonding the second side 106 of the backing layer 102 to the first side 110 of the honeycomb core 108 using the adhesive 130 within the backing layer 102. Further, the application of the heat (optionally) and pressure cures the panel subassembly 400, for example, by curing the adhesive 140 that impregnates the mesh layer 114, thereby bonding the first side 116 of the mesh layer 114 to the second side 112 of the honeycomb core 108.

After curing the panel subassembly (e.g., the adhesives 130, 140) the cured panel subassembly 400 is removed from the vacuum bag 402 as depicted in the lower portion of FIG. 4. Subsequently, the first side 122 of the acoustic fabric face sheet 120 is attached to the second side 118 of the mesh layer 114 using an adhesive layer 142 that is or can include one or more of a thermoplastic, a thermoset, an acrylic, a polyamide, a polyester, a urethane, and/or a rubberized adhesive, combinations of two or more of these, or another suitable adhesive. The adhesive layer 142 can be applied as a spray, a hot melt, or by roll coating. As depicted, the adhesive layer 142 that attaches the acoustic fabric face sheet 120 to the mesh layer 114 is applied in such a way that the adhesive layer 142 is patterned to form a cross sectional non-continuous layer to overlie only the plurality of walls 132 of the honeycomb core 108, so that the adhesive layer 142 does not overlie the plurality of honeycomb cells 134. Forming the adhesive layer 142 as a blanket layer would result in reflection of sound waves from the adhesive layer 142 before the sound waves enter the honeycomb cells 134, thereby decreasing sound wave absorption by the acoustic panel 100. Forming the adhesive layer 142 as a patterned layer ensures that the sound waves pass through the cross sectional openings or voids within the adhesive layer 142 and enter the honeycomb cells 134 so that reflection of the sound waves from the acoustic panel 100 is attenuated.

Figure 5:
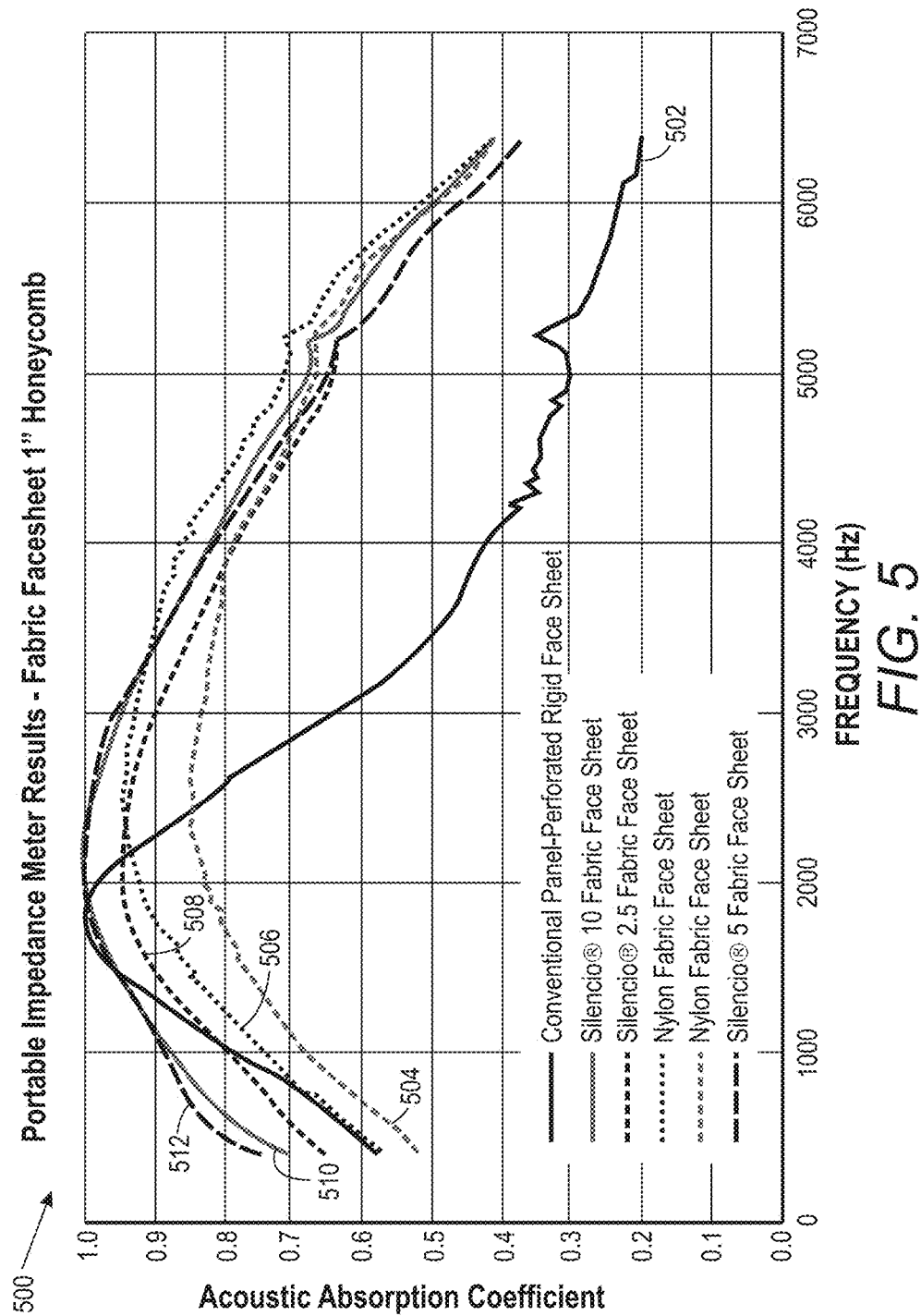
FIG. 5 is a graph comparing acoustic absorption characteristics for a conventional acoustic panel with acoustic panels in accordance with the present teachings.

FIG. 5 is a graph 500 that plots acoustic absorption coefficients for a plurality of different acoustic panels over a range of frequencies, where the frequencies range from about 500 hertz (Hz) to about 6500 Hz. The results were measured using a Brüel & Kjær® brand portable impedance meter, type 9737. Reference number 502 plots the results for a conventional acoustic panel using a perforated rigid face sheet. Reference numbers 504-512 plot points for acoustic panels having various fabric face sheets overlying a honeycomb core. Reference numbers 504 and 506 plot the results for two plain weave nylon fabric samples, where the two fabric samples vary with respect to areal weights. Reference numbers 508, 510, and 512 plot the results for the acoustic panel surfaced with a Silencio® 2.5, Silencio® 10, and Silencio® 5 materials respectively (commercially available from Pongs® Textil GmbH). Silencio® fabrics are polyester fiber acoustic textiles, where the polyester fibers have a particular chemical structure, and the reference numbers "2.5," "5," and "10" refer to a dimension of decorative diamonds, in millimeters, that are formed as three dimensional features of each particular fabric. Each of the samples shown included a honeycomb core having a thickness of 1.0 inch.

As shown in FIG. 5, the acoustic panels formed in accordance with the present teachings include an acoustic fabric as a face sheet (i.e., the panels identified by reference numbers 504-512) had better sound absorbing properties over a wider range of frequencies than the conventional acoustic panel including the perforated rigid face sheet (identified by reference number 502). Particularly at frequencies in the range of about 2500 Hz to 6500 Hz, all of the acoustic panels 504-512 using the identified acoustic fabrics were superior at decreasing reflected sound waves than the conventional acoustic panel 502 using the perforated face sheet. In particular, the acoustic panels that included Silencio® 10 and Silencio® 5 (identified by reference numbers 510 and 512 respectively) as the acoustic fabric face sheet 120 were better than the conventional acoustic panel using the perforated face sheet (identified by reference number 502) at almost every frequency between 2500 Hz and 6500 Hz, being about equal at the narrow frequency range between about 1250 Hz and about 1800 Hz.

Further, it was found that an acoustic panel with an acoustic fabric and a honeycomb core having a thickness of 1.0 inches was better at attenuating reflected sound than a similar acoustic panel with a honeycomb core having a thickness of 0.5 inches. In general, an acoustic panel in accordance with the present teachings can have a honeycomb core with a thickness of from about 0.25 inches to about 2.0 inches, or from about 0.5 inches to 1.5 inches, for example about 1.0 inch, or another suitable thickness depending on the use and design. An acoustic panel having a honeycomb core that is excessively thin will not provide suitable sound wave reflection attenuation, while an acoustic panel having a honeycomb core that is too thick will require excessive space within vehicle compartments.

In some implementations, the acoustic panel will have an absorption coefficient ranging from about 0.6 to about 1.0 (e.g., from 0.6 to 1.0) as measured by ASTM E1050-98, over a broad frequency range from 400 Hz to 5,000 Hz. This is compared to the acoustic fabric tested alone which, depending on its air permeability and other factors, will have an absorption coefficient of between 0.2 and 0.3. A solid-faced honeycomb core panel will have an absorption coefficient near zero, corresponding to 100% of sound waves being reflected.

Figure 6:
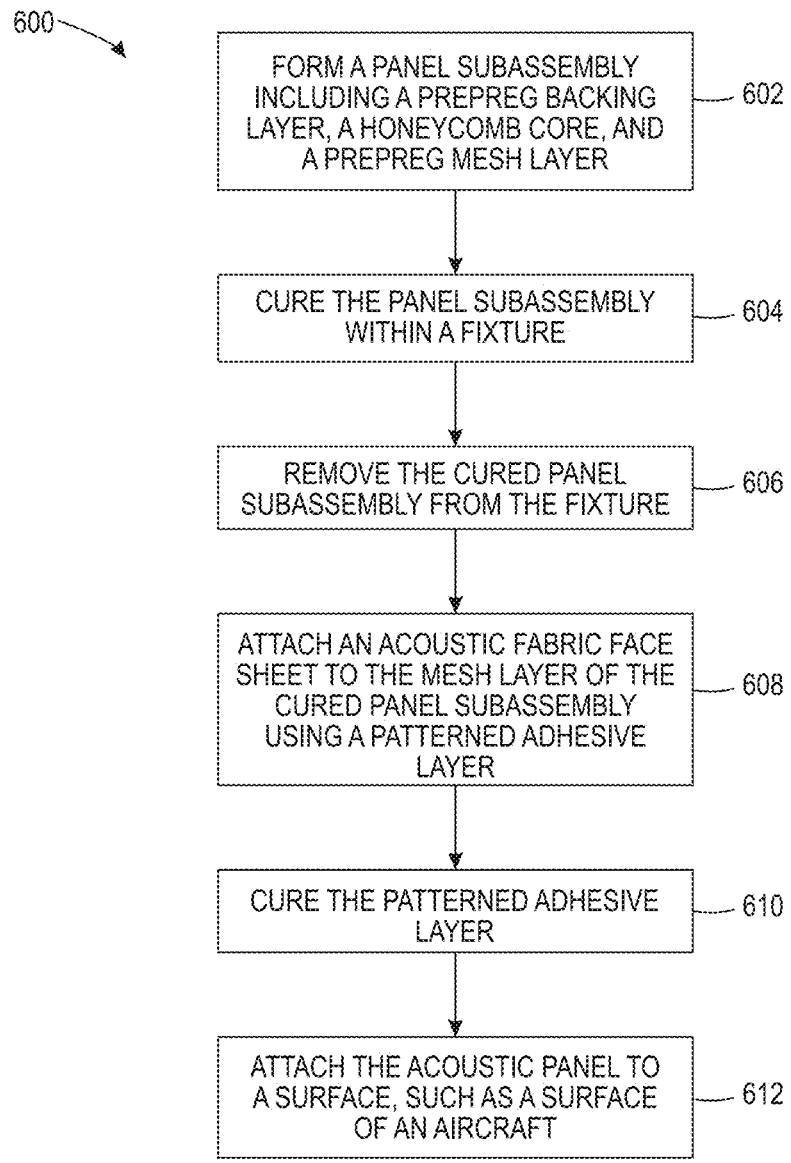
FIG. 6 is a flow chart or flow diagram depicting a method for forming an acoustic panel.

Methods for forming an acoustic panel and/or for using an acoustic panel in accordance with the present teachings will now be described. FIG. 6 is a flow chart or flow diagram of a method 600 for forming or using an acoustic panel 100. The method 600 may proceed by operation or use of one or more of the structures depicted in FIGS. 1-4, and thus the method is described with reference to these figures; however, it will be appreciated that the method 600 is not limited to any particular structure or use unless expressly stated herein. The method 600 may be performed before, during, or after other processes, for example, as an assembly sub-process. It will be appreciated that while the process is described as a series of acts or events, the present teachings are not limited by the ordering of such acts or events. Some acts may occur in different orders and/or concurrently with other acts or events apart from those described herein. Further, a method in accordance with the present teachings may include other acts or events that have not been depicted for simplicity, while one or more depicted acts or events may be removed or modified as sub-processes of the method 600.

The implementation of FIG. 6 begins by forming a panel subassembly 400 including a backing layer 102, a honeycomb core 108, and a mesh layer 114, as at 602. In this implementation, the backing layer 102 is pre-impregnated with a first adhesive 130 and the mesh layer 114 is pre-impregnated with a second adhesive 140, which can be the same or different than the first adhesive 130. (As used herein, unless otherwise specified, the terms "first," "second," and "third," with respect to adhesives impregnated within another structure and/or adhesive layers that mechanically attach two structures together are used merely to uniquely identify distinct adhesive layers or adhesives and do not imply assembly order with respect to any manufacturing process.) With the honeycomb core 108 in physical contact with the backing layer 102 and the mesh layer 114, heat and/or pressure are applied to the panel subassembly 400, for example within a fixture 402 such as a vacuum bag 402, to cure the first adhesive 130 and the second adhesive 140 as at 604, thereby attaching the second side 106 of the backing layer 102 to the first side 110 of the honeycomb core 108, and the second side 112 of the honeycomb core 108 to the first side 116 of the mesh layer 114. As shown at 606, the panel subassembly 400 can be removed from the fixture 402 subsequent to curing the adhesives 130, 140.

Next, as depicted at 608, an acoustic fabric face sheet 120 is attached as a face sheet to the panel subassembly 400 and, more specifically, the first side 122 of the acoustic fabric face sheet 120 is attached to the second side 118 of the mesh layer 114 subsequent to the curing of the first adhesive 130 and the second adhesive 140, where the first adhesive 130 can be the same composition or a different composition than the second adhesive 140. The attachment can include the use of an adhesive layer 142 between the mesh layer 114 and the acoustic fabric face sheet 120. The adhesive layer 142 can be applied to either the second side 118 of the mesh layer 114, the first side 122 of the acoustic fabric face sheet 120, or both, then the acoustic fabric face sheet 120 is physically contacted with the mesh layer 114 and the adhesive layer 142 is cured using any suitable technique. While the adhesive layer 142 is being cured, a compressive pressure can be applied to the acoustic fabric face sheet 120 to maintain alignment with the honeycomb core 108, and to maintain physical contact of the adhesive layer 142 with the honeycomb core 108 and the acoustic fabric face sheet 120. The adhesive layer 142 is applied in a pattern such that, after attaching the acoustic fabric face sheet 120 to the mesh layer 114, the adhesive layer 142 overlies the plurality of walls 132 of the honeycomb core 108 and does not overlie the plurality of honeycomb cells 134 of the honeycomb core 108, for the reasons discussed above. After any additional desired processing, the acoustic panel 100 can be attached to a surface, such as for example, to the surface 200 (FIG. 2) of an transportation vehicle 700 (FIG. 7) using a fastener 202.

During testing, it was found that excessive pressure applied to the acoustic fabric face sheet 120 during attachment to the honeycomb core 108 permanently deformed the exposed surface of the acoustic fabric face sheet 120. This deformation decreased the esthetics of the completed surface, which is visually exposed and visible after attachment of the acoustic panel 100 to the vehicle surface 200 during use of the acoustic panel 100. Thus, compressive pressure applied to the acoustic fabric face sheet 120 during manufacture of the acoustic panel 100 should be sufficiently low to avoid crushing the acoustic fabric face sheet 120. In an implementation, a compressive pressure of from about 1.0 pounds per square inch (psi) to about 15.0 psi can be applied to the acoustic fabric face sheet 120, for example, using a suitable fixture 402, although other compressive pressures are contemplated as long as the acoustic properties of the acoustic fabric face sheet 120 are not negatively affected, compromised, or degraded. Compressive pressures below 1.0 psi can result in insufficient bonding of the acoustic fabric face sheet 120 to the underlying structure, while compressive pressures greater than 15.0 psi can result in damage or deformation of the acoustic fabric face sheet 120. As elevated temperatures and atmospheric pressures also tend to damage the acoustic fabric face sheet 120 during the application of a compressive force, the bonding of the adhesive layer 142 to the acoustic fabric face sheet 120 is best performed at or near room temperature (e.g., from 65° F. to 75° F.) and at or near standard atmospheric pressure.

Figure 7:
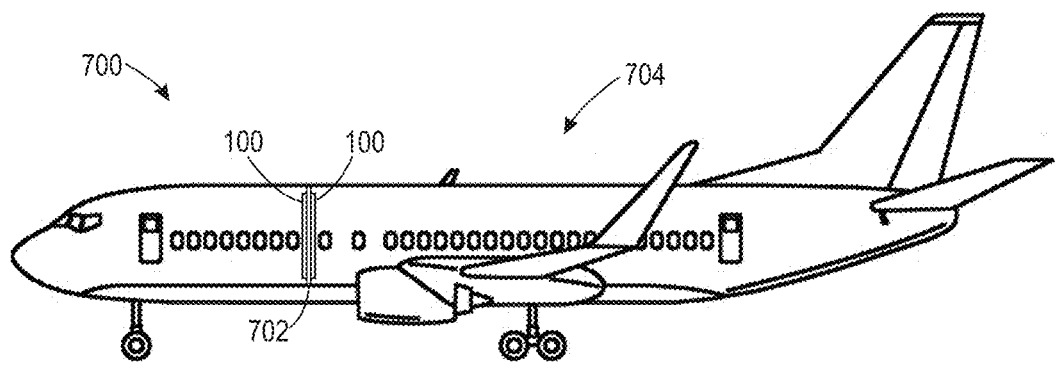
FIG. 7 is a side view of a vehicle (an aircraft) including acoustic panels in accordance with an implementation of the present teachings.

FIG. 7 depicts a vehicle 700 into which one or more acoustic panels 100 in accordance with the present teachings are installed. While FIG. 7 depicts an aircraft 700, it will be appreciated that the one or more acoustic panels 100 can be installed in other transportation vehicles such as other types of aerospace vehicles, watercraft, a railway vehicle or other overland vehicles, etc., or applied to other non-vehicle uses where mitigation of ambient sound such as reflected sound is desired. In this implementation, the acoustic panels 100 are attached to both vertical sides of a bulkhead 702 that divides areas within a passenger compartment 704 of the vehicle 700.

An acoustic panel 100 in accordance with the present teachings can have a decreased reflection of sound waves compared to conventional acoustic panels, for example, as demonstrated by the graph 500 of FIG. 5. Further, the acoustic panels of the present teachings can be lighter in weight.

Figure 8:
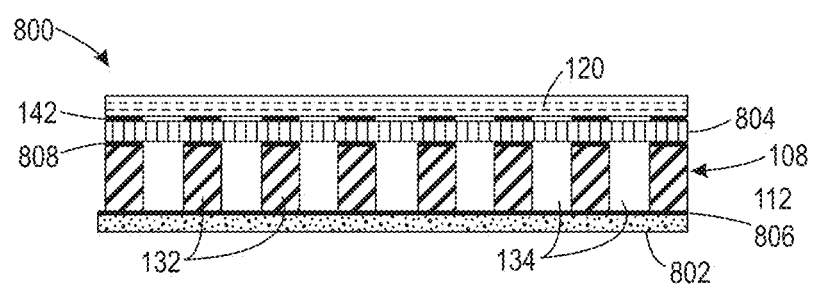
FIG. 8 is a cross section of another acoustic panel according to the present teachings.

It will be appreciated that various other acoustic panel implementations and methods of formation are contemplated. For example, FIG. 8 depicts an acoustic panel 800 including a backing layer 802, a honeycomb core 108, a mesh layer 804, and an acoustic fabric face sheet 120. In this implementation, the acoustic panel 800 is not formed using prepreg structures, but instead includes a plurality of discrete adhesive layers. The backing layer 802 and the mesh layer 804 can be analogous to the backing layer 102 and the mesh layer 114 respectively of the FIG. 1 implementation. However, in contrast to backing layer 102, backing layer 802 is not impregnated with adhesive 130. Further, in contrast to mesh layer 114, mesh layer 804 is not impregnated with adhesive 140. The adhesive layer 142 depicted in FIG. 800 can be a material as described above with reference to FIG. 4, and is thus numbered the same.

In this implementation, the backing layer 802 is physically attached to the honeycomb core 108 with a first adhesive layer 806 and the honeycomb core 108 is physically attached to the mesh layer 804 with a second adhesive layer 808. The mesh layer 804 can be physically attached to the acoustic fabric face sheet 120 as described above with reference to FIG. 4 using the adhesive layer 142 which, in this implementation, thus provides a third adhesive layer 142. Each of the adhesive layers 806, 808, 142 can be or include one or more of a thermoplastic, a thermoset, an acrylic, a polyamide, a polyester, a urethane, and/or a rubberized adhesive, combinations of two or more of these, or another suitable adhesive, where each of the adhesive layers 806, 808, 142 can be the same or different, each from each other.

As depicted in FIG. 8, the first adhesive layer 806 can be formed as a blanket layer, while the second adhesive layer 808 and the third adhesive layer 142 are formed as patterned layers. The patterning of the second adhesive layer 808 and the third adhesive layer 142 forms cross sectional non-continuous layers to overlie only the plurality of walls 132 of the honeycomb core 108, so that the second adhesive layer 808 and the third adhesive layer 142 do not overlie the plurality of honeycomb cells 134. Forming the second adhesive layer 808 and the third adhesive layer 142 as a blanket layers would result in reflection of sound waves from these adhesives before the sound waves enter the honeycomb cells 134, thereby decreasing sound wave absorption by the acoustic panel 800. Forming these layers as patterned layers ensures that the sound waves pass through the cross sectional openings or voids within the adhesive layers and enter the honeycomb cells 134 so that reflection of the sound waves from the acoustic panel 800 is attenuated.

It will be appreciated that in some methods of formation of the acoustic panel 800, each of the layers are assembled as a single structure as depicted in FIG. 8, then all of the adhesive layers 806, 808, 142 can be simultaneously cured. In other implementations, formation of the acoustic panel 800 can be performed by forming two or more subassemblies, which are then assembled to form the completed acoustic panel 800. For example, in one implementation, the honeycomb core 108 can be attached to the backing layer 802 using the first adhesive layer 806, which is cured using a suitable curing process. Next, the mesh layer 804 can be attached to the honeycomb core 108 using the second adhesive 808, which is cured using a suitable curing process. Subsequently, the acoustic fabric face sheet 120 can be attached to the mesh layer 804 using the third adhesive layer 142, which is then cured using a suitable curing process. Other implementations for assembling the acoustic panel 800 are contemplated.

Thus, an acoustic panel in accordance with the present teachings can be lighter in weight than conventional acoustic panels, thereby reducing operating costs of transportation vehicles. Additionally, in contrast to conventional acoustic panels that use a rigid perforated face sheet that is difficult to manufacture, an acoustic panel in accordance with the present teachings uses a flexible fabric face sheet that provides a visually appealing surface without additional processing. The acoustic fabric face sheet can include one or more of a polyester, an aramid polymer, an aromatic polyamide, meta-aramid fibers, a modacrylic fabric, a fabric including a high-density carbon shell that encases a viscoelastic core, and/or para-aramid fibers. The acoustic panel can further include a mesh layer that includes one or more of a fiberglass fabric, a polyester fabric, an 8800 leno weave knitted fabric, a nylon, a rayon, an acrylic, cotton, wool, and combinations of two or more thereof. Moreover, the acoustic panel can include a backing layer that is moisture-resistant, where the backing layer can include one or more of fiberglass, carbon fiber, a poly-paraphenylene terephthalamide fabric, a meta-aramid fabric, metal, paper, wood, or plastic. Furthermore, an acoustic panel according to the present teachings can provide superior sound attenuation compared to a conventional acoustic panel.

It is contemplated that acoustic panels according to the present teaching may be installed into a vehicle 700 (FIG. 7) during an initial manufacture of such vehicles. Furthermore, vehicles manufactured with conventional acoustic panels can be retrofitted with acoustic panels according to the present teachings, for example, if such retrofitting is cost effective (e.g., results in reduced fuel costs due to decreased weight) or otherwise desirable (e.g., crew and/or passenger fatigue over a period of time is decreased due to reduced noise within the vehicle). Retrofitting can include, for example, removing conventional acoustic panels (e.g., acoustic panels having a perforated metal face sheet) and replacing them with acoustic panels according to the present teachings (e.g., acoustic panels having an acoustic fabric face sheet).

By installing an acoustic panel that includes an acoustic fabric face sheet in accordance with the present teachings into a transportation vehicle, either during an initial manufacturing process or a retrofitting process, noise within the transportation vehicle can be reduced or attenuated. The installing process can include manufacturing an acoustic panel in accordance with the present teachings or procuring a pre-manufactured acoustic panel in accordance with the present teachings from a supplier. The acoustic panel can be attached to a surface of the transportation vehicle. In another implementation, an in-process or fully completed transportation vehicle including one or more acoustic panels in accordance with the present teaching can be purchased from a supplier. In any of the foregoing scenarios, during use of the transportation vehicle, noise is reduced or attenuated during use of the transportation vehicle, where the noise reduction or attenuation results, at least in part, from the acoustic panel that includes the acoustic fabric face sheet.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. An acoustic panel, comprising:
   a backing layer;
   a honeycomb core attached to the backing layer with a first adhesive layer, the honeycomb core comprising a first side, a second side, a thickness that extends from the first side to the second side, and a plurality of walls that define a plurality of honeycomb cells, wherein the plurality of honeycomb cells extend through the thickness of the honeycomb core from the first side to the second side;
   a mesh layer comprising a second impregnated adhesive layer attached to the honeycomb core; and
   an acoustic fabric face sheet attached to the mesh layer with a third adhesive layer comprising an acrylic, a polyester, a urethane, a rubberized adhesive, or a combination thereof, wherein the acoustic panel is configured so that the acoustic fabric face sheet is visually exposed during use of the acoustic panel, and the third adhesive layer is arranged such that it overlies only the plurality of walls of the honeycomb core and is not directly on the plurality of walls of the honeycomb core.

2. The acoustic panel of claim 1, wherein the acoustic fabric face sheet comprises a woven fabric, a knitted fabric, or both.

3. The acoustic panel of claim 2, wherein the acoustic fabric face sheet comprises one or more of a polyester, an aramid polymer, an aromatic polyamide, meta-aramid fibers, a modacrylic fabric, a fabric including a high-density carbon shell that encases a viscoelastic core, and/or para-aramid fibers.

4. The acoustic panel of claim 1, wherein the mesh layer comprises one or more of a fiberglass fabric, a polyester fabric, an 8800 leno weave knitted fabric, a nylon, a rayon, an acrylic, cotton, wool, and combinations of two or more thereof.

5. The acoustic panel of claim 1, wherein the backing layer is impregnated with the first adhesive layer.

6. The acoustic panel of claim 1, wherein the backing layer is moisture resistant and comprises one or more of fiberglass, carbon fiber, a poly-paraphenylene terephthalamide fabric, a meta-aramid fabric, metal, paper, wood, or plastic.

7. The acoustic panel of claim 1, wherein the acoustic panel has an absorption coefficient of from 0.6 to 1.0 as measured by ASTM E1050-98 over a frequency range of from 400 Hz to 5,000 Hz.

8. The acoustic panel of claim 1, wherein the thickness of the honeycomb core is from 0.25 inches to 2.0 inches.

9. A noise reducing system comprising an acoustic panel attached to a surface that defines a passenger compartment of a transportation vehicle, the acoustic panel comprising:
   a backing layer;
   a honeycomb core attached to the backing layer with a first adhesive layer, the honeycomb core comprising a first side, a second side, a thickness that extends from the first side to the second side, and a plurality of walls that define a plurality of honeycomb cells, wherein the plurality of honeycomb cells extend through the thickness of the honeycomb core from the first side to the second side;
   a mesh layer comprising a second impregnated adhesive layer attached to the honeycomb core; and
   an acoustic fabric face sheet attached to the mesh layer with a third adhesive layer comprising an acrylic, a polyester, a urethane, a rubberized adhesive, or a combination thereof, wherein the acoustic panel is configured so that the acoustic fabric face sheet is visible to passengers during use of the transportation vehicle, and the third adhesive layer is arranged such that it overlies only the plurality of walls of the honeycomb core and is not directly on the plurality of walls of the honeycomb core.

10. The noise reducing system of claim 9, wherein the acoustic fabric face sheet comprises a woven fabric, a knitted fabric, or both.

11. The noise reducing system of claim 10, wherein the acoustic fabric face sheet comprises one or more of a polyester, an aramid polymer, an aromatic polyamide, meta-aramid fibers, a modacrylic fabric, a fabric including a high-density carbon shell that encases a viscoelastic core, and/or para-aramid fibers.

12. The noise reducing system of claim 9, wherein the mesh layer comprises one or more of a fiberglass fabric, a polyester fabric, an 8800 leno weave knitted fabric, a nylon, a rayon, an acrylic, cotton, wool, and combinations of two or more thereof.

13. The noise reducing system of claim 9, wherein the backing layer of the acoustic panel is impregnated with the first adhesive layer.

14. The noise reducing system of claim 9, wherein the backing layer of the acoustic panel is moisture resistant and comprises one or more of fiberglass, carbon fiber, a poly-paraphenylene terephthalamide fabric, a meta-aramid fabric, metal, paper, wood, or plastic.

15. The noise reducing system of claim 9, wherein the acoustic panel has an absorption coefficient of from 0.6 to 1.0 as measured by ASTM E1050-98 over a frequency range of from 400 Hz to 5,000 Hz.

16. The noise reducing system of claim 9, wherein the thickness of the honeycomb core is from 0.25 inches to 2.0 inches.

17. A method for forming an acoustic panel, comprising:
   attaching a backing layer to a first side of a honeycomb core with a first adhesive layer, wherein the honeycomb core further comprises a second side opposite to the first side, a thickness that extends from the first side to the second side, and a plurality of walls that define a plurality of honeycomb cells, wherein the plurality of honeycomb cells extend through the thickness of the honeycomb core from the first side to the second side;
   attaching a first side of a mesh layer comprising an impregnated second adhesive layer to the second side of the honeycomb core; and
   attaching an acoustic fabric face sheet to a second side of the mesh layer with a third adhesive layer comprising an acrylic, a polyester, a urethane, a rubberized adhesive, or a combination thereof, wherein the acoustic panel is configured so that the acoustic fabric face sheet is visually exposed during use of the acoustic panel, and the third adhesive layer is arranged such that it overlies only the plurality of walls of the honeycomb core and is not directly on the plurality of walls of the honeycomb core.

18. The method of claim 17, wherein the backing layer is pre-impregnated with a first adhesive and the method further comprises:
   stacking the backing layer, the honeycomb core, and the mesh layer to form a panel subassembly;
   applying a heat and a pressure to the panel subassembly to cure the first adhesive layer and the impregnated second adhesive layer of the panel subassembly, thereby bonding the backing layer and the mesh layer to the honeycomb core; and subsequent to curing the first adhesive layer and the impregnated second adhesive layer, attaching the acoustic fabric face sheet to the mesh layer using the third adhesive layer.

19. The method of claim 17, wherein the acoustic fabric face sheet comprises one or more of a polyester, an aramid polymer, an aromatic polyamide, meta-aramid fibers, a modacrylic fabric, a fabric including a high-density carbon shell that encases a viscoelastic core, and/or para-aramid fibers.

20. The method of claim 17, wherein the mesh layer comprises one or more of a fiberglass fabric, a polyester fabric, an 8800 leno weave knitted fabric, a nylon, a rayon, an acrylic, cotton, wool, and combinations of two or more thereof.

* * * * *